T. L. WHITBECK.
Seed Planter.
No. 61,904.
2 Sheets—Sheet 1.
Patented Feb. 5, 1867.
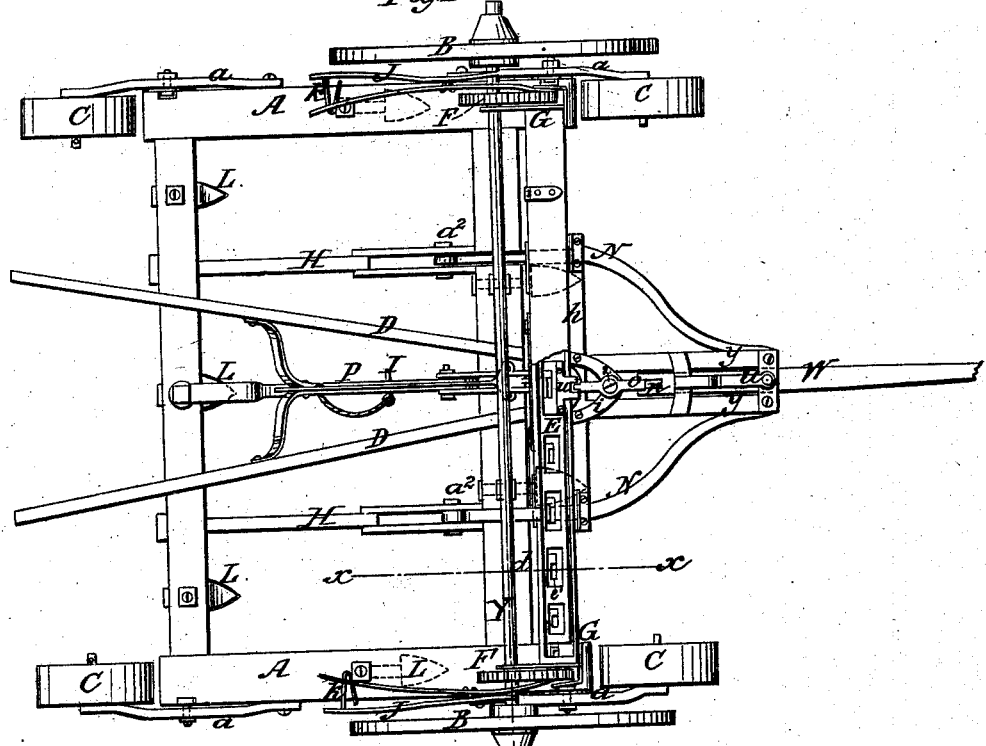
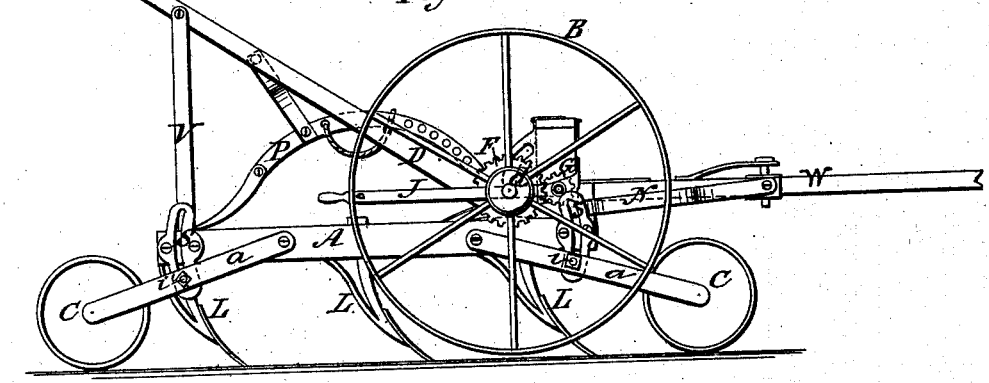
Witnesses.
F. A. Jackson.
Alex T. Roberts
Inventor.
T. L. Whitbeck
Per Munn & Co
Attys.

T. L. WHITBECK.
Seed Planter.
No. 61,904.
2 Sheets—Sheet 2.
Patented Feb. 5, 1867.
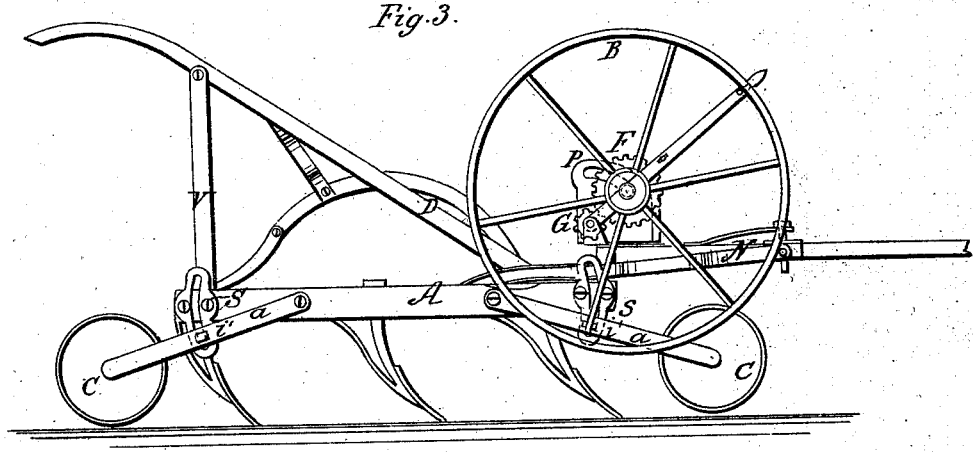
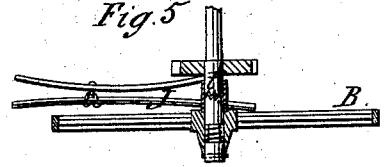
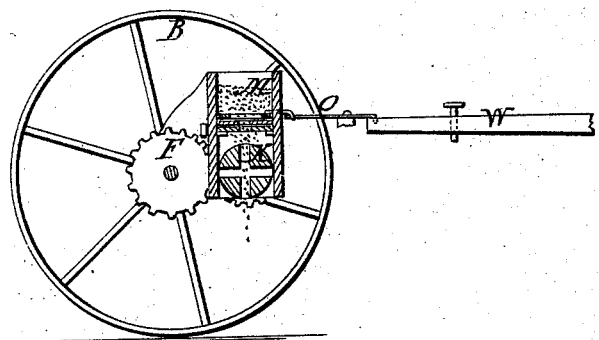
Witnesses
F. A. Jackson
Alex T. Roberts.
Inventor.
T. L. Whitbeck
Per Munn & Co.
Attys.

United States Patent Office.

THOMAS L. WHITBECK, OF KENOSHA, WISCONSIN.

Letters Patent No. 61,904, dated February 5, 1867.

---

IMPROVEMENT IN COMBINED SEED-SOWER AND CULTIVATOR.

---

*The Schedule referred to in these Letters Patent and making part of the same.*

---

TO ALL WHOM IT MAY CONCERN:

Be it known that I, THOMAS L. WHITBECK, of Kenosha, Kenosha county, and State of Wisconsin, have invented a new and improved Cultivator and Seed-Sower; and I do hereby declare that the following is a full, clear, and exact description thereof.

The nature of my invention consists in so combining a seed-sower and cultivator, that each may be used separately or both at the same time, as the nature of the work to be done may require. It more particularly consists in the simple, cheap, and novel manner by which I work the slide in the bottom of the seed-box for agitating and regulating the flow of seed to the openings of the discharge cylinder by the vibration of the tongue or pole by which the machine is drawn.

Figure 1 is a top plan view of my improved cultivator and sower.

Figure 2 is a side elevation of the same, showing the seed-box in position for the combined machine.

Figure 3 is a side elevation, showing the seed-box turned out of position when the cultivator is only to be used.

Figure 4 is a transverse sectional elevation of the seed-box taken from the line $x\,x$.

Figure 5 is a longitudinal vertical section taken from the line $y\,y$, showing the clutch by which the traction-wheels are thrown out and into gear.

To enable others skilled in the art to make and use my invention, I will proceed to describe its construction and operation.

Letters of like name and kind refer to like parts in each of the figures.

A is a rectangular frame, made of wood or other suitable material, to which is rigidly secured any desired number of cultivator teeth or ploughs, and of any suitable or desired form. To the said frame A are pivoted levers or arms, $a\,a\,a\,a$, extending to the rear and front of the frame A. At the outer ends of the said levers or arms are attached, and run upon suitable journals, caster-wheels, $c\,c\,c\,c$, which bear the frame A, and upon which it is carried. To the said frame A are attached curved slotted plates, S S S S, through which screw-bolts, $i'$, pass through corresponding holes in the levers or arms $a$, so that the caster-wheels $c$ may be elevated and lowered for the purpose of regulating or gauging the depth of the ploughs L L L, which may be done by means of the screw-bolts $i'$, and held in any desired position. B B are two traction-wheels of common or ordinary construction, running upon the axle or shaft $d$, which runs in slotted bearings, R, fig. 3. Upon each end of the said shaft $d$ are rigidly secured spur gear-wheels, F F, which mesh into corresponding pinions, G, which are also rigidly secured to the seed cylinder K, the said cylinder being located in the bottom of the seed-box M, fig. 4. Upon the inside of the hubs of the wheels B B are clutches, $t$, as seen in fig. 5, which may be thrown out and into each other, and secured in position for the purpose of tightening and loosening the wheels B upon the shaft $d$, the said clutch being operated by the lever J. E is the slide, provided with slots or openings $e'$, through which the grain passes to the cylinder, and by which it is agitated. It will be seen that a portion of the seed-box and slide are broken out, as enough is shown to illustrate my invention. W is the tongue or pole, by which the machine is drawn, and by which it is guided. It will here be observed that the back or rear end of the tongue or pole is bevelled or tapered from the draw-bolt $w$ back, (fig. 1,) so that the rear end does not fill the space between the hounds or braces Y Y; also that there is a slot or mortise, $n$, at the extreme rear end of the pole, which is made to fit upon the lever $o$, which works upon the pivot-bolt 2, which passes through the strap-brace $i$; the rear end of the lever $o$ is attached to the slide E. When the cultivator is only to be used, the pole is turned over, so that it fills the space between the hounds or braces Y Y, thus making it rigid in its position. N N are braces, extending upon a curve from the front end of the hounds or braces Y Y, back to the rear of the front portion of the main frame A, where it is attached by means of screw-bolts, $a^2$, to the bifurcated braces or bars H H. These braces or bars H H are provided with holes, so that a change of draught may be obtained by shifting the braces N N into different holes in the braces or bars H H, so that when the braces N N are moved back it causes a more downward draught upon the front caster-wheels and the front teeth of the cultivator. P is a brace, something in form of an arc of a circle, extending from front to rear of the frame A, and provided with holes, so that the seed-box and traction-wheels may be elevated and secured in an elevated position by means of a pin, I.

The operation for using the combined machine consists simply in filling the seed-box M with seed and adjusting the ploughs so they will cover the seed at any desired depth. The team is then attached to the pole or tongue W, and as it proceeds across the field the vibration of the tongue upon the pivot-bolt 2, fig. 1, caused by the unevenness or sinuosities of the ground with which the caster-wheels come in contact, works the slide E through the medium of the pivot-lever o, which reciprocates the slide-valve E, so that the grain will not become clogged or matted in the bottom of the seed-box, to give a regular and unerring feed to the cylinder as it revolves, the cylinder receiving its motion through the medium of the gear-wheels, which is imparted and received from the traction-wheels before described. When the cultivator is alone to be used, the seed-box, together with the traction-wheels, are elevated and turned over upon the rear end of the pole, thus clearing the traction-wheels from the ground and obviating all impediments of the sower in operating the cultivator alone or separately from the seeder, thus rendering it one of the most cheap, simple, and efficient combined machines in use.

Having thus described my invention, what I claim as new, and desire to secure by Letters Patent, is—

1. I claim the bars N N, in combination with the bifurcated bars or braces H H, so they can be adjusted to form a centre draught and to vary the bearing or pressure upon the caster-wheels.

2. I also claim the circular brace P and pin I, in combination with seed-box and frame A, substantially as shown and described.

3. A combined cultivator and seeder, so combined and arranged that the seed-box M, together with the traction-wheels B B, may be elevated upon the pole and carried without impeding the operation of the cultivator, for the purposes and substantially as herein described.

4. A seeder, where the slide in the seed-box is worked and operated by the pole W through the medium of the lever o or its equivalent, for the purposes and substantially as herein set forth.

5. The pole W, lever o, slide E, and cylinder M, in combination with the spur-wheel F, pinion G, shaft d, and traction-wheels B B, all for the purposes and substantially as described.

THOMAS L. WHITBECK.

Witnesses:
   H. H. HAWKS,
   O. E. SHERWOOD.